United States Patent
Stuart

(10) Patent No.: US 6,377,649 B1
(45) Date of Patent: Apr. 23, 2002

(54) MOLD COUNTER

(75) Inventor: James P. Stuart, Bloomfield Village, MI (US)

(73) Assignee: PCS Company, Fraser, MI (US)

( * ) Notice: Subject to any disclaimer, the term of this patent is extended or adjusted under 35 U.S.C. 154(b) by 0 days.

(21) Appl. No.: 09/459,699

(22) Filed: Dec. 13, 1999

(51) Int. Cl.$^7$ ................................................ G07C 3/00
(52) U.S. Cl. ........................................... 377/15; 377/16
(58) Field of Search ..................................... 377/16, 15

(56) References Cited

U.S. PATENT DOCUMENTS

| | | | |
|---|---|---|---|
| 3,762,907 A | * 10/1973 | Quinn et al. ................... | 65/164 |
| 4,142,238 A | * 2/1979 | Brandt et al. .................. | 377/16 |
| 4,380,801 A | * 4/1983 | Motomura et al. ........... | 377/16 |
| 4,493,987 A | 1/1985 | Kammeraad ................ | 235/1 D |
| 5,057,000 A | 10/1991 | Mangone, Jr. .............. | 425/190 |
| 5,571,539 A | 11/1996 | Starkey ....................... | 425/135 |

FOREIGN PATENT DOCUMENTS

| | | | | |
|---|---|---|---|---|
| ES | U2000001004 | 1/2000 | | |
| FR | 8001171 | 7/1981 | ........... | B29F/10/22 |
| JP | 62139611 | 9/1987 | ........... | B29C/45/76 |
| JP | 6317009 | 1/1988 | ........... | B29C/33/00 |
| JP | 241910 | 3/1990 | ........... | B29C/33/00 |
| JP | 4212826 | 8/1992 | ........... | B29C/45/76 |
| WO | EP0355606 B1 | 2/1990 | ........... | H01H/50/08 |
| WO | EP0355606 A2 | 2/1990 | ........... | H01H/50/08 |
| WO | EP0497991 B1 | 8/1991 | ........... | B29C/45/76 |
| WO | EP 0497991 A1 | 8/1991 | ........... | B29C/45/76 |

OTHER PUBLICATIONS

*Machining*; Moldmaking Products; 1999; p. 59.

* cited by examiner

*Primary Examiner*—Margaret R. Wambach
(74) *Attorney, Agent, or Firm*—Howard & Howard

(57) ABSTRACT

A counting apparatus is disclosed, having a resettable counter, for counting the number of times a mold closes. The counting apparatus includes a body that is mountable to a mold block section, an electronic counting mechanism connected to the body, and a reset mechanism connected to the body that resets the counting mechanism to zero or some other settable number. Additionally, the counting mechanism includes a sensor, a triggering mechanism, and a counter display. The sensor detects when the mold has been closed and then communicates such with the triggering mechanism. The triggering mechanism then triggers the counter display to increase or decrease by the number of units associated with the closing of the mold.

33 Claims, 3 Drawing Sheets

MOLD COUNTER

BACKGROUND OF THE INVENTION

The present invention relates to a counting apparatus that counts the number of times a mold closes and more particularly to a counting apparatus that can be reset to zero.

Companies that manufacture or produce molded parts need to track mold activity for several reasons, including, but not limited to: 1) monitoring their supply usage; 2) determining supply purchase frequency; 3) tracking the number of pieces manufactured in a given period of time; and 4) determining how much money the company can make on their produced parts. Therefore, the companies count the number of parts produced and keep a manual record of that information. Counting apparatuses are useful because they validate the manually kept records.

Apparatuses for counting the number of times a mold closes are well known. Typically, the counters include a counter display and a triggering mechanism that triggers the counter to increase by one. The counters are mounted to one section of the mold base. Further, the counter detects when one section of the base comes in contact with another section of the base. The contact between the sections occurs when the mold is being closed to produce a part. Once the counter detects contact between sections, the counter display is triggered to increase by the number of units associated with the closing of the mold (usually one), thus reflecting the number of mold assemblies representative of the number of parts produced.

Prior art, counters may also be mounted on a mold section. The prior art counter may include a body, a counter display and an internal, purely mechanical trigger. The body is flush with the mold section, so that it does not interfere with construction of the mold sections. The mechanical trigger includes a moveable arm that extends from the body and is not flush with the mold section. The arm remains extended until it comes into contact with another mold section. When the arm comes into contact with another mold section, the arm is pushed into the counter body, thus triggering the counter to increase by one.

Three prior art versions of the counters exist. The first version is mounted by sink fitting it along the parting line of the mold block. The second version is an internal extension mount. Essentially, this version contains an extension that fits on the moveable arm so that the counter can be mounted away from a parting line. The third version is an externally mounted, two-piece assembly that can be added to the mold without sink fitting.

A disadvantage of this type of counter is that there is no way to reset the counter display back to a specific reading or a zero reading. The beginning number needs to be recorded and some arithmetic needs to be performed to calculate the number of pieces produced. This added step increases the amount of time required to use the counter. Further, if the beginning number is not recorded, then the counter becomes useless for subsequent uses.

SUMMARY OF THE INVENTION

The counting apparatus of the present invention overcomes the above problem with known counting mechanisms. In general terms, this invention is an apparatus having a resettable counter for counting the number of times a mold closes. The number of times a mold closes is representative of the number of pieces created by the mold. The apparatus includes a body that is mountable to a mold block, an electronic counting mechanism connected to the body, and a reset mechanism connected to the body for resetting the counting mechanism to zero. This invention is also advantageous because it is smaller in size than other available models and is more versatile because it has several different triggering configurations.

DETAILED DESCRIPTION OF THE PREFERRED EMBODIMENT

Figure 1:
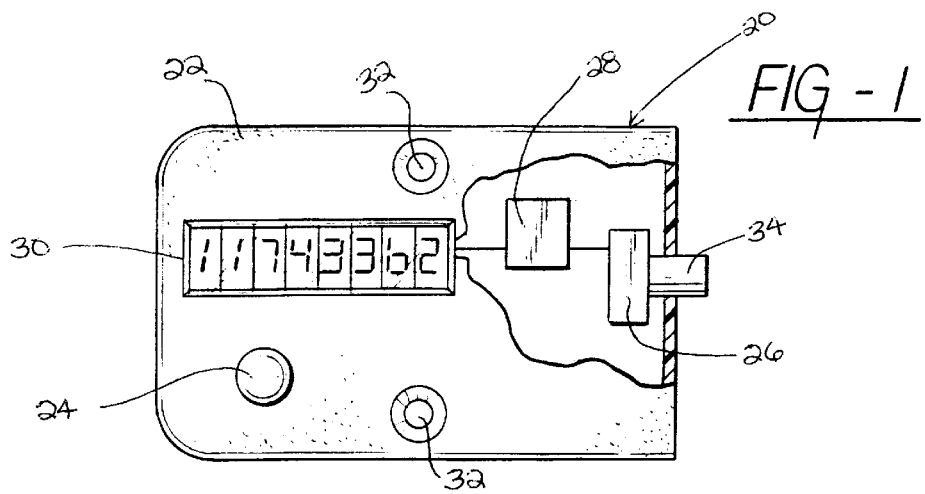
FIG. 1 is a top, internal view of the preferred embodiment of the counting apparatus of the present invention.

FIG. 1 schematically illustrates the internal components of an apparatus for counting the number of times a mold closes, generally shown at 20. The counting apparatus 20 includes a body 22 that can be mounted to a mold block section, an electronic counting mechanism connected to the body 22, and a reset mechanism 24 connected to the body 22. The reset mechanism 24 resets the counting mechanism to zero.

The counting mechanism includes a sensor 26, a triggering mechanism 28, and a counter display 30. The sensor 26 detects when the mold has been closed and then communicates that the mold has closed with the triggering mechanism 28. The triggering mechanism 28 then triggers the counter display 30 to increase by the number of units associated with the closing of the mold (usually one).

In an alternative embodiment, the counter display 30 could be set to a desired total number and the triggering mechanism 28 would trigger the counter display 30 to decrease by the number of units associated with the closing of the mold (usually one).

Figure 2:
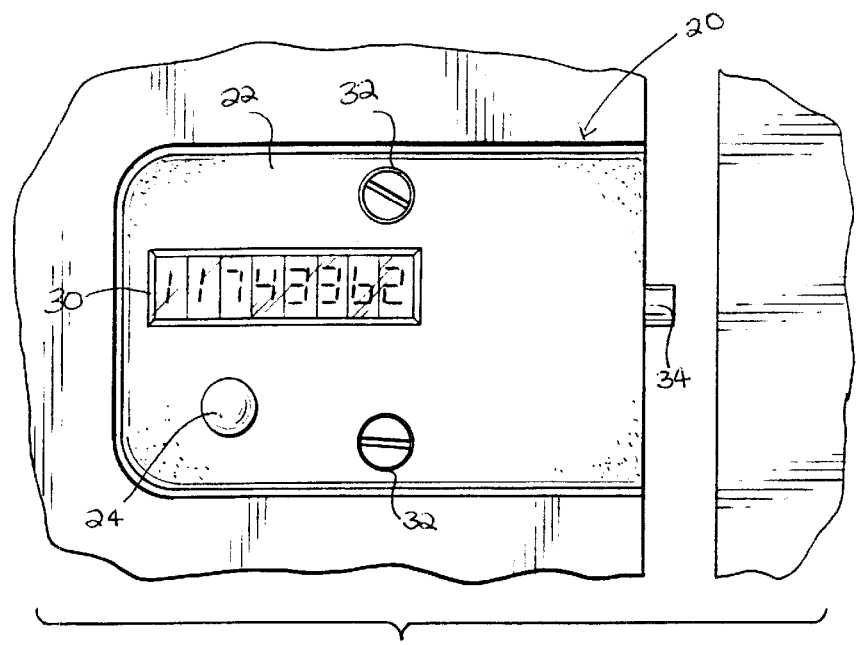
FIG. 2 is a top, exterior view of the preferred embodiment of the counting apparatus of the present invention.
Figure 3:
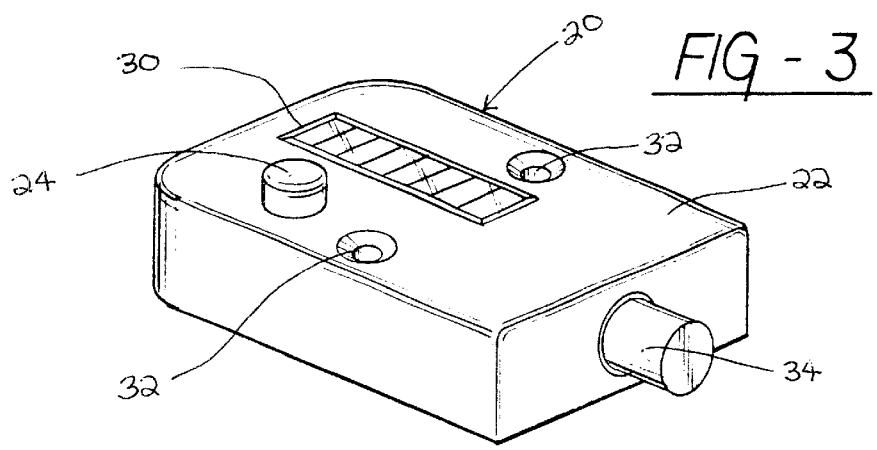
FIG. 3 is a perspective view of the counting apparatus of FIG. 1.

FIGS. 2 and 3 illustrate the exterior of the counting apparatus 20. The body 22 of the counter is generally rounded at one end and squared at the other end. Additionally, the body 22 has at least one hole 32, preferably two, for receiving bolts to bolt the counter 20 to the mold section.

Figure 4:
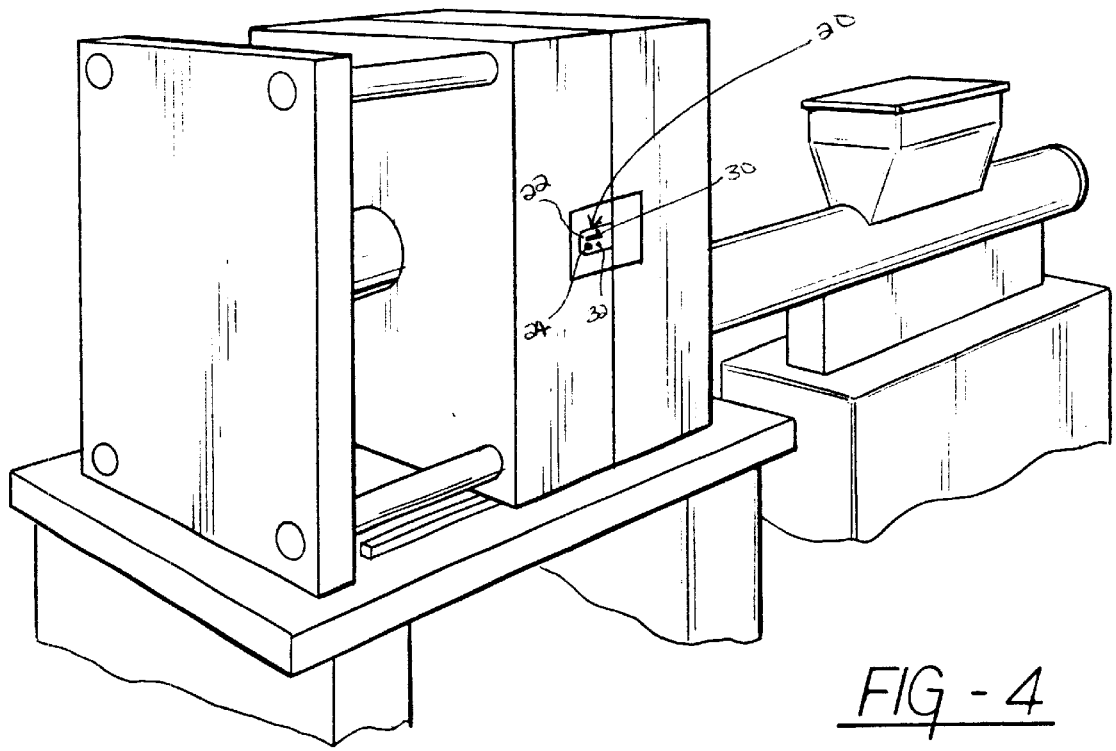
FIG. 4 is a perspective view of the counting apparatus of FIG. 1 mounted to a mold block section contacting another mold block section.
Figure 5:
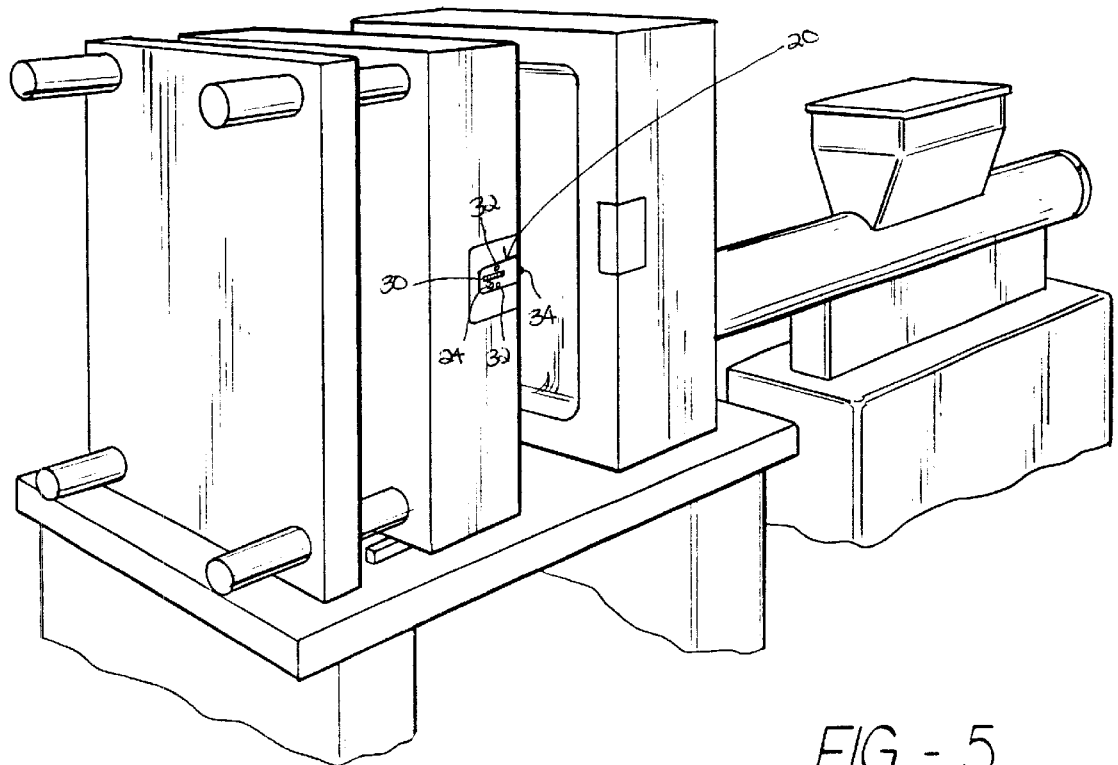
FIG. 5 is a perspective view of the counting apparatus of FIG. 1 mounted to a mold block section not contacting another mold block section.

FIGS. 4 and 5 illustrate the counting apparatus mounted to a mold block section. The sensor 26 includes either a microprocessor or a movable arm. FIGS. 1–5 illustrate a moveable arm 34. The movable arm 34 is operatively connected to the body 22. In other words, the movable arm 34 is completely extended away from the body 22 when the mold sections are not put together, as shown in FIG. 5. However, when the mold sections are put together, the movable arm 34 completely retracts into the body 22 and triggers the triggering mechanism 28 to increase or decrease the counter display 30 by the number of units associated with the closing of the mold (usually one), as shown in FIG. 4.

There are several options available for the triggering mechanism 28. The triggering mechanism 28 could be located internal to the body 22, external to the body 22, or remotely from the body 22. The internal, external, and remote triggering mechanisms could all be either electrical, mechanical, pneumatic, hydraulic, timed, or electronically programmable.

Figure 6:
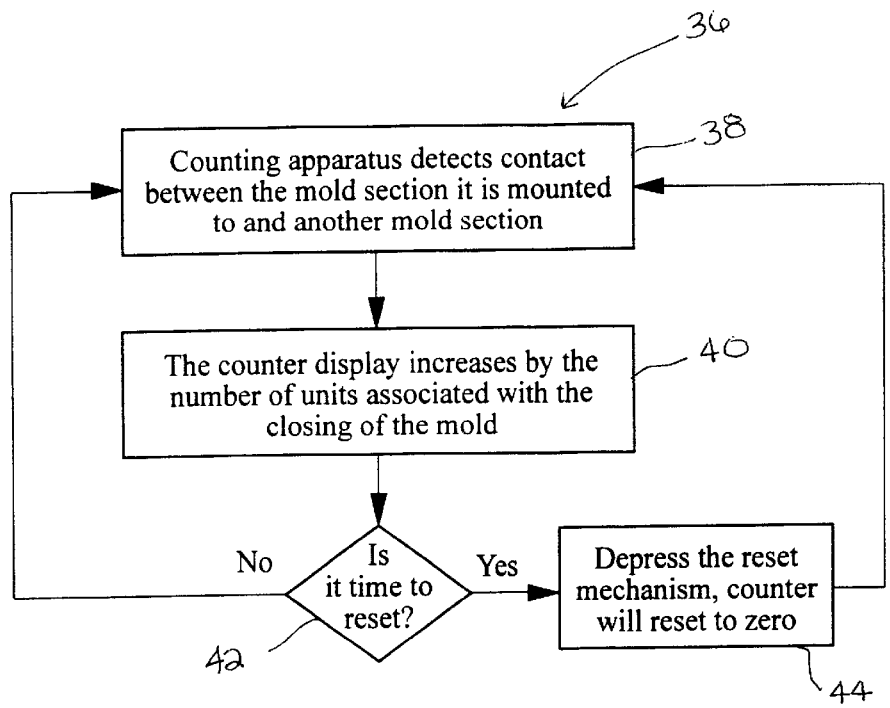
FIG. 6 is a flowchart diagram illustrating the preferred method of this invention.

FIG. 6 schematically illustrates the preferred method of operating the counting apparatus 20. The flow chart 36 includes a first step at 38 where the sensor 26 detects contact between two mold sections. Once contact has been detected, the counter display 30 is triggered to increase by the number of units associated with the closing of the mold, as shown at 40. Next, a determination is made, at 42, whether to reset the counter display 30 to zero. If the counter display 30 should be reset, the reset mechanism 24 is depressed, at 44, and the counter display 30 resets to zero. The counter apparatus 20 continues to detect when mold sections come into contact. On the other hand, if the counter display 30 should not be reset, the counter display 30 continues to reflect the total number of times the mold sections come into contact.

Figure 7:
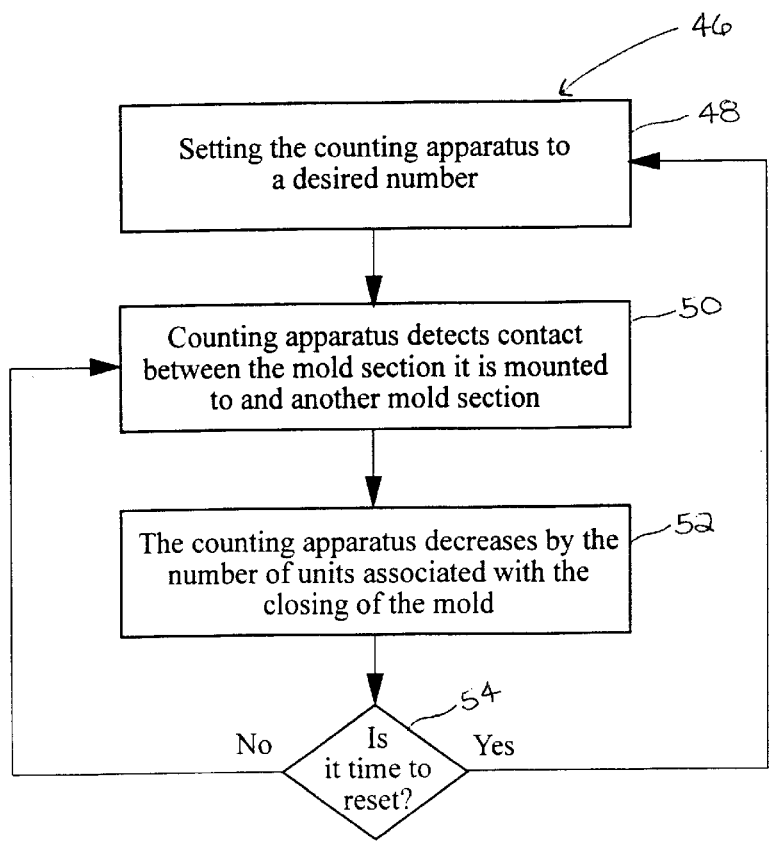
FIG. 7 is a flowchart diagram illustrating an alternative method of this invention.

FIG. 7 schematically illustrates an alternative method of operating the counting apparatus 20. The flow chart 46 includes a first step at 48 where the counter display 30 is set to a desired number. At 50, the sensor 26 detects contact between two mold sections. Once contact has been detected, the counter display 30 is triggered to decrease by the number of units associated with the closing of the mold, as shown at 52. Next, a determination is made, at 54, whether to reset the counting apparatus 20. If the counting apparatus 20 should be reset, the counter display 30 would be reset to a desired number and would continue to detect when mold sections come into contact. On the other hand, if the counting apparatus 20 should not be reset, the counter display 30 continues to decrease by the number of units associated with the closing of the mold.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. An apparatus for counting the number of times a mold closes, said apparatus comprising:

a body, wherein said body is mountable to a mold block;

an electronic counting mechanism connected to said body wherein said counting mechanism comprises;

a sensor that detects when the mold has been closed;

a reset mechanism connected to said body to reset said counting mechanism to zero;

a triggering mechanism wherein said sensor communicates with said triggering mechanism when the mold has been closed; and a counter display connected to said triggering mechanism, wherein said counter display increases by one when triggered by said triggering mechanism.

2. An apparatus as set forth in claim 1, wherein said body has a first end and a second end and said body is generally rounded at said first end and generally squared at said second end.

3. An apparatus as set forth in claim 2, wherein said body has at least one hole for receipt of at least one bolt for bolting said body to the mold block.

4. An apparatus as set forth in claim 1, wherein said sensor comprises a microprocessor.

5. An apparatus as set forth in claim 1, wherein said sensor comprises a movable arm operatively connected to said body, said movable arm being movable from a first position to a second position, wherein said arm is completely extended away from said body in said first position and said arm is completely retracted into said body to trigger said counter display in said second position.

6. An apparatus as set forth in claim 1, wherein said triggering mechanism is an internal electrical device.

7. An apparatus as set forth in claim 1, wherein said triggering mechanism is an internal mechanical device.

8. An apparatus as set forth in claim 1, wherein said triggering mechanism is an internal pneumatic device.

9. An apparatus as set forth in claim 1, wherein said triggering mechanism is an internal hydraulic device.

10. An apparatus as set forth in claim 1, wherein said triggering mechanism is an internal timed device.

11. An apparatus as set forth in claim 1, wherein said triggering mechanism is an internal programmable, electronic device.

12. An apparatus as set forth in claim 1, wherein said triggering mechanism is an external electrical device.

13. An apparatus as set forth in claim 1, wherein said triggering mechanism is an external mechanical device.

14. An apparatus as set forth in claim 1, wherein said triggering mechanism is an external pneumatic device.

15. An apparatus as set forth in claim 1,wherein said triggering mechanism is an external hydraulic device.

16. An apparatus as set forth in claim 1, wherein said triggering mechanism is an external timed device.

17. An apparatus as set forth in claim 1, wherein said triggering mechanism is an extenal programmable, electronic device.

18. An apparatus as set forth in claim 1, wherein said triggering mechanism is a remote electrical device.

19. An apparatus as set forth in claim 1, wherein said triggering mechanism is a remote mechanical device.

20. An apparatus as set forth in claim 1, wherein said triggering mechanism is a remote pneumatic device.

21. An apparatus as set forth in claim 1, wherein said triggering mechanism is a remote hydraulic device.

22. An apparatus as set forth in claim 1, wherein said triggering mechanism is a remote timed device.

23. An apparatus as set forth in claim 1, wherein said triggering mechanism is a remote programmable, electronic device.

24. An apparatus as set forth in claim 1, wherein said reset mechanism is located on said body.

25. An apparatus as set forth in claim 24, wherein said reset mechanism is external and has a set resistance.

26. An apparatus as set forth in claim 24, wherein said reset mechanism is recessed into said body and has a set resistance.

27. An apparatus as set forth in claim 1, wherein said reset mechanism is remotely located from said body.

28. A method of counting the number of times a mold closes, comprising the steps of:

(A) detecting contact between two sections of a mold;

(B) triggering a counter display to increase by one;

(C) determining when to reset the counter to zero; and (D) resetting the counter to zero.

29. A method of counting the number of times a mold closes, comprising the steps of:

(A) detecting contact between two sections of a mold;

(B) electronically triggering a counter to increase by the number of units associated with the closing of the mold; and (C) determining when to reset the counter to zero.

30. The method of claim 29, further comprising the step of:

(D) resetting the counter.

31. The method of claim 30, further comprising the step of:

(E) resetting the counter to zero.

32. A method of counting the number of times a mold closes, comprising the steps of:

(A) setting a counter to a desired number;

(B) detecting contact between two sections of a mold;

(C) electronically triggering the counter to decrease by the number of units associated with the closing of the mold; and (D) determining when to reset the counter.

33. The method of claim 32, further comprising the step of:

(E) resetting the counter.

* * * * *